US012704441B2

(12) United States Patent
Tate et al.

(10) Patent No.: US 12,704,441 B2
(45) Date of Patent: Aug. 11, 2026

(54) SYSTEMS AND METHODS FOR SAMPLING

(71) Applicants: DH TECHNOLOGIES DEVELOPMENT PTE. LTD., Singapore (SG); Stephen Tate, Concord (CA)

(72) Inventors: Stephen Tate, Barrie (CA); Yves Le Blanc, Newmarket (CA); Thomas R. Covey, Newmarket (CA)

(73) Assignee: DH Technologies Development Pte. Ltd., Singapore (SG)

(*) Notice: Subject to any disclaimer, the term of this patent is extended or adjusted under 35 U.S.C. 154(b) by 318 days.

(21) Appl. No.: 18/547,787

(22) PCT Filed: Feb. 24, 2022

(86) PCT No.: PCT/IB2022/051652
§ 371 (c)(1),
(2) Date: Aug. 24, 2023

(87) PCT Pub. No.: WO2022/180576
PCT Pub. Date: Sep. 1, 2022

(65) Prior Publication Data

US 2024/0175787 A1 May 30, 2024

Related U.S. Application Data

(60) Provisional application No. 63/218,754, filed on Jul. 6, 2021, provisional application No. 63/153,586, filed on Feb. 25, 2021.

(51) Int. Cl.
*G01N 30/72* (2006.01)
*G01N 1/14* (2006.01)
(Continued)

(52) U.S. Cl.
CPC ................ *G01N 1/14* (2013.01); *G01N 1/38* (2013.01); *G01N 30/7233* (2013.01); *G01N 2001/149* (2013.01); *G01N 2030/027* (2013.01)

(58) Field of Classification Search
CPC ........ G01N 1/14; G01N 1/38; G01N 30/7233; G01N 2001/149; G01N 2030/027; G01N 30/72; G01N 27/44791; H01J 49/0404
See application file for complete search history.

(56) References Cited

U.S. PATENT DOCUMENTS 5,109,840 A 5/1992 Daleiden
5,332,512 A * 7/1994 Wells ....................... G01N 1/38
96/417

(Continued)

FOREIGN PATENT DOCUMENTS

CN 102354649 A 2/2012
CN 109844901 A 6/2019

(Continued)

OTHER PUBLICATIONS

Anonymous, "Turbo V Ion Source Operator Guide", AB Sciex Pte, Ltd., Aug. 1, 2015, retrieved from the internet on Mar. 17, 2022 at: https://manualzz.com/doc/7476753/user-guide--turbo-v-ion-source-operator-guide, "TurbolonSpray Probe Optimization", and "Adjust the Electrode Tip Extension", 52 pages.

(Continued)

*Primary Examiner* — David J Bolduc
(74) *Attorney, Agent, or Firm* — Merchant & Gould P.C.

(57) ABSTRACT

A system includes a capillary having a first end connected to a sampling device and a second end. The sampling device is configured to separate a sample with a separation solution and deliver the sample and the separation solution to the second end. The second end is coupled to a capillary ground contact. A transport liquid supply system in fluidic commu- (Continued)

nication with a transport liquid supply conduit provides a transport liquid from a transport liquid source through the transport liquid supply conduit. The transport liquid provided from the transport liquid supply conduit includes a receiving volume defined at least in part by a meniscus. The second end of the capillary is in fluidic communication with the receiving volume. A liquid exhaust system in fluidic communication with a removal conduit removes liquid from the receiving volume. An analysis system is in fluidic communication with the removal conduit.

19 Claims, 11 Drawing Sheets

(51) Int. Cl.

*G01N 1/38* (2006.01)
*G01N 30/02* (2006.01)

(56) References Cited

U.S. PATENT DOCUMENTS

| | | | | |
|---|---|---|---|---|
| 5,691,205 | A | 11/1997 | Kawabata et al. | |
| 5,736,741 | A * | 4/1998 | Bertsch | H01J 49/0404 73/864.81 |
| 5,750,881 | A * | 5/1998 | Dorenkott | G01F 11/021 73/864.11 |
| 6,478,238 | B1 * | 11/2002 | Wachs | B05B 5/03 239/338 |
| 7,923,681 | B2 | 4/2011 | Collings et al. | |
| 8,759,753 | B1 | 6/2014 | Di Bussolo | |
| 9,134,335 | B2 | 9/2015 | Dehmer | |
| 10,770,277 | B2 | 9/2020 | Datwani et al. | |
| 11,232,938 | B2 | 1/2022 | Arnold et al. | |
| 2002/0048536 | A1 | 4/2002 | Bergh et al. | |
| 2003/0122070 | A1 * | 7/2003 | Chang | H01J 49/165 250/292 |
| 2003/0193020 | A1 | 10/2003 | Van Berkel | |
| 2004/0102742 | A1 | 5/2004 | Tuyl | |
| 2006/0054805 | A1 * | 3/2006 | Flanagan | H01J 49/04 250/288 |
| 2007/0039866 | A1 * | 2/2007 | Schroeder | C12Q 1/6869 210/265 |
| 2007/0175757 | A1 * | 8/2007 | Hanafusa | G01N 27/44756 204/601 |
| 2010/0181199 | A1 * | 7/2010 | Sugiyama | G01N 27/44721 204/601 |
| 2011/0120867 | A1 * | 5/2011 | Mishina | G01N 27/44791 204/601 |
| 2012/0043206 | A1 * | 2/2012 | Molho | G01N 27/44791 204/600 |
| 2012/0053065 | A1 | 3/2012 | Van Berkel | |
| 2012/0079894 | A1 * | 4/2012 | Van Berkel | H01J 49/165 73/863.11 |
| 2012/0083045 | A1 | 4/2012 | Van Berkel et al. | |
| 2012/0304747 | A1 * | 12/2012 | Van Berkel | G01N 1/38 73/61.59 |
| 2013/0023005 | A1 | 1/2013 | Chen et al. | |
| 2013/0092166 | A1 | 4/2013 | Pearce | |
| 2013/0118498 | A1 | 5/2013 | Robitaille et al. | |
| 2013/0294971 | A1 | 11/2013 | Van Berkel et al. | |
| 2014/0096624 | A1 * | 4/2014 | ElNaggar | G01N 1/14 73/864.34 |
| 2014/0216177 | A1 | 8/2014 | Van Berkel et al. | |
| 2014/0283627 | A1 | 9/2014 | Hattingh et al. | |
| 2015/0210999 | A1 * | 7/2015 | Sahoyama | C12N 15/101 204/601 |
| 2015/0318160 | A1 | 11/2015 | Pawliszyn et al. | |
| 2015/0340219 | A1 * | 11/2015 | Mellors | G01N 27/44791 250/288 |
| 2015/0360237 | A1 * | 12/2015 | Hayes | G01N 30/0005 703/2 |
| 2016/0126080 | A1 * | 5/2016 | Kertesz | H01J 49/04 250/288 |
| 2016/0160211 | A1 * | 6/2016 | Huge | G01N 27/44791 506/37 |
| 2016/0266017 | A1 | 9/2016 | Kennedy et al. | |
| 2016/0299041 | A1 * | 10/2016 | Kertesz | G01N 1/24 |
| 2016/0299109 | A1 * | 10/2016 | Van Berkel | G01N 1/20 |
| 2017/0003256 | A1 * | 1/2017 | Ziegler | F16L 11/127 |
| 2017/0102359 | A1 * | 4/2017 | Yan | G01N 27/44756 |
| 2017/0110307 | A1 * | 4/2017 | Mellors | G01N 27/44791 |
| 2017/0219522 | A1 * | 8/2017 | Furtaw | G01N 27/44791 |
| 2017/0234841 | A1 * | 8/2017 | Van Berkel | G01N 1/20 |
| 2017/0316926 | A1 | 11/2017 | Arnold et al. | |
| 2018/0021533 | A1 | 1/2018 | Gausche-Hill et al. | |
| 2018/0100839 | A1 * | 4/2018 | Van Berkel | A61B 10/02 |
| 2018/0348178 | A1 * | 12/2018 | Van Berkel | G01N 30/7233 |
| 2019/0072464 | A1 | 3/2019 | Wiederin | |
| 2019/0157061 | A1 | 5/2019 | Datwani et al. | |
| 2019/0369068 | A1 * | 12/2019 | Gentalen | G01N 30/8624 |
| 2020/0043712 | A1 | 2/2020 | Arnold et al. | |
| 2020/0166490 | A1 | 5/2020 | Wiechers | |
| 2020/0251323 | A1 * | 8/2020 | Zimmermann | G01N 30/7233 |
| 2020/0345968 | A1 | 11/2020 | Merrell et al. | |
| 2020/0365382 | A1 | 11/2020 | Arnold et al. | |
| 2021/0121905 | A1 | 4/2021 | Covey | |
| 2021/0190735 | A1 | 6/2021 | Bonda | |
| 2021/0341439 | A1 * | 11/2021 | Van Berkel | G01N 1/00 |
| 2023/0184642 | A1 | 6/2023 | Liu | |
| 2023/0280351 | A1 | 9/2023 | Iannotti | |
| 2023/0349858 | A1 | 11/2023 | Covey | |
| 2024/0079225 | A1 | 3/2024 | Covey | |
| 2024/0096611 | A1 | 3/2024 | Covey | |
| 2024/0112901 | A1 | 4/2024 | Liu | |
| 2024/0159716 | A1 | 5/2024 | Cox | |
| 2024/0170270 | A1 | 5/2024 | Kovarik | |
| 2024/0170271 | A1 | 5/2024 | Kovarik | |
| 2024/0272191 | A1 | 8/2024 | Verma | |

FOREIGN PATENT DOCUMENTS

| | | |
|---|---|---|
| CN | 211318299 | 8/2020 |
| EP | 0421007 | 4/1991 |
| EP | 2443432 | 4/2012 |
| JP | H 04-253150 A | 9/1992 |
| JP | H 05-045333 A | 2/1993 |
| JP | H 08-236064 A | 9/1996 |
| JP | H 09-082269 A | 3/1997 |
| JP | H 11-317192 A | 11/1999 |
| JP | 2003-504183 A | 1/2001 |
| JP | 2011007690 A | 1/2011 |
| JP | 2012-502296 A | 1/2012 |
| JP | 2019-521320 A | 7/2019 |
| JP | 2020-500297 A | 1/2020 |
| WO | 2010/048339 | 12/2010 |
| WO | 2011/146269 | 11/2011 |
| WO | 2012/149314 | 11/2012 |
| WO | 2013/112914 | 8/2013 |
| WO | 2014/140776 | 9/2014 |
| WO | 2015/108807 | 7/2015 |
| WO | 2015/188282 | 12/2015 |
| WO | 2016/164766 | 10/2016 |
| WO | 2018/217778 | 11/2018 |
| WO | 2019/102350 | 5/2019 |
| WO | 2019/126363 | 6/2019 |
| WO | 2020/016809 | 1/2020 |
| WO | 2020/079647 | 4/2020 |
| WO | 2021/234644 | 11/2021 |
| WO | 2022/167917 | 8/2022 |
| WO | 2022/167980 | 8/2022 |
| WO | 2022/172156 | 8/2022 |
| WO | 2022/172199 | 8/2022 |
| WO | 2022/201037 | 9/2022 |
| WO | 2022/208393 | 10/2022 |
| WO | 2022/259187 | 12/2022 |
| WO | 2024/241262 | 11/2024 |

OTHER PUBLICATIONS

(56) References Cited

OTHER PUBLICATIONS

Bonvin, Gregoire et al., "Capillary electrophoresis; electrospray ionization-mass spectrometry interfaces: Fundamental concepts and technical developments", Journal of Chromatopgraphy A, vol. 1267, Dec. 1, 2012, pp. 17-31.
Dirico, Kenneth et al., "Ultra-High-Throughput Acoustic Sroplet Ejection-Open Port Interface-Mass Spectrometry for Parallel Medicinal Chemistry", ACS Medicinal Chemistry Letters, vol. 11, No. 6, May 1, 2020, pp. 1101-1110.
Hager, James et al., "Product ion scanning using Q-q-Q linear ion trap (Q TRAP) mass spectrometer", Rapid Communications in Mass Spectrometry, 2003; 17: 1056-1064.
Liu, Chang et al., "Operational Modes and Speed Considerations of an Acoustic Droplet Dispenser for Mass Sectrometry", Analytical Chemistry, vol. 92, No. 24, Oct. 16, 2020, pp. 15818-15826.
Maxwell, E. Jane et al., "Decoupling CE and ESI for a more robust interface with MS", Electrophoresis, Verlag-Chemie, Hoboken, USA, vol. 31, No. 7, Mar. 1, 2010, pp. 1130-1137.
PCT International Preliminary Report on Patentability in Application PCT/IB2022/051652, mailed Sep. 7, 2023, 11 pages.
PCT International Search Report and Written Opinion in Application PCT/IB2022/051652, mailed May 23, 2022, 19 pages.
Pei, Jian et al., "Analysis of Samples Stored as Individual Plugs in a Capilaary by Electrspray Ionization Mass Spectrometry", Analytical Chemistry, vol. 81, No. 15, Aug. 1, 2009, pp. 6558-6561.
Pei, Jian et al., "Rapid and Label-Free Screening of Enzyme Inhibitors Using Segmented Flow Electrospray Ionization Mass Spectrometry", Journal of the American Society for Mass Spectrometry, Elsevier, vol. 21, No. 7, Jul. 1, 2010, pp. 1107-1113.
SCIEX, Echo MS Core Module User Guide, published by SCIEX, RUO-IDV-05-9945-C, Apr. 2020, 51 pages.
Simon, Roman et al., "Acoustic Ejection Mass Spectrometry: A Fully Automatable Technology for High-Throughput Screening in Drug Discovery", Society for Laboratory Automation and Screening, vol. 26, Jul. 26, 2021, pp. 961-973.
Tascon, Marcos et al., "Development of a microfluidic open interface with flow isolated desorption volume for the direct coupling of SPME devices to mass spectrometry", Analytical Chemistry, vol. 90, No. 4, Feb. 1, 2018, pp. 2631-2638.
Van Berkel et al., Immediate drop on demand technology (I-DOT) coupled with mass spectrometry via an open-port sampling interface, Bioanalysis, vol. 9, No. 21, Nov. 2, 2017, pp. 1667-1679.
Van Berkel, Gary et al., "An open port sampling interface for liquid introduction atmosperic pressure ionization mass spectrometry: Open port sampling interface", Rapid Communications in Mass Spectrometry, vol. 29, No. 19, Oct. 15, 2015, pp. 1749-1756.
Van Berkel, Gary et al., "Combined Falling Drop/Open Port Sampling Interface System for Automated Flow Injection Mass Spectrometry", Analytic Chemistry, 2017, 89, 22, pp. 12578-12586.
Wen, Xiujuan et al., "Direct Analysis from Phase-Separated Liquid Samples using ADE-OPI-MS: Applicability to High-Throughput Screening for Inhibitors of Diacylglycerol Acyltransferase 2", Analytic Chemistry, 2021, 93, 15, 6071-6079.
Zhang, Hui et al., "Acoustic Ejection Mass Spectrometry for High-Throughput Analsis", bioRxiv, Jan. 29, 2020, retrieved from the internet on Sep. 8, 2021 at: https:www.biorxiv.org/content/10.1101/2020.01.28.923938v1.full.pdf, 32 pages.
Zhang, Hui et al., "Acoustic Ejection Mass Spectrometry for High-Throughput Analysis", Analytical Chemistry, Jan. 29, 2020, 12 pages.
Li, Xianjiang et al., "Sampling and analyte enrichment strategies for ambient mass spectrometry", Anal Bioanal Chem (2018), 410:715-724.
Li, Xin-Xin, et al., "Method for Improving Spatial Resolution of Liquid-assisted Surface Desorption Atmospheric Pressure Chemical Ionization Mass Spectrometry", Chinese Journal of Analytical Chemistry, vol. 44, Issue 1, Jan. 2016, pp. 25-31.
Japanese Refusal and Search Report in Application 2023-548923, mailed Dec. 4, 2025, 7 pages.

* cited by examiner

SYSTEMS AND METHODS FOR SAMPLING

CROSS-REFERENCE TO RELATED APPLICATIONS

This application is a National Stage Application of PCT/IB2022/051652, filed on Feb. 24, 2022, which claims the benefit of U.S. Provisional Application No. 63/153,586, filed on Feb. 25, 2021, and U.S. Provisional Application No. 63/218,754, filed on Jul. 6, 2021, the entire disclosures of which are incorporated herein by reference in their entireties. To the extent appropriate, a claim of priority is made to each of the above disclosed applications.

BACKGROUND

Mass spectrometry (MS) based methods can achieve label-free, universal mass detection of a wide range of analytes with exceptional sensitivity, selectivity, and specificity. As a result, there is significant interest in improving the throughput of MS-based analysis for many applications.

SUMMARY

In one aspect, the technology relates to a system including: a capillary having a first end connected to a sampling device and a second end, wherein the sampling device is configured to separate a sample with a separation solution and deliver the sample and the separation solution to the second end, wherein the second end is coupled to a capillary ground contact; a transport liquid supply system in fluidic communication with a transport liquid supply conduit that provides a transport liquid from a transport liquid source through the transport liquid supply conduit, wherein the transport liquid provided from the transport liquid supply conduit includes a receiving volume defined at least in part by a meniscus, and wherein the second end of the capillary is in fluidic communication with the receiving volume; a liquid exhaust system in fluidic communication with a removal conduit that removes liquid from the receiving volume; an electrical conductor for connecting the transport liquid supply conduit to the removal conduit; a first electrical contact connected to the transport liquid supply conduit; and an analysis system in fluidic communication with the removal conduit. In an example, the second end of the capillary is disposed within the meniscus and wherein the capillary ground contact includes at least in part the receiving volume. In another example, the second end of the capillary is disposed in the removal conduit and wherein the capillary ground contact includes at least in part the receiving volume. In yet another example, a perimeter of the second end of the capillary is spaced apart from the removal conduit. In still another example, the system further includes an interface coupled to the transport liquid supply conduit and the second end of the capillary, wherein the interface defines the receiving volume proximate the removal conduit.

In another example of the above aspect, the second end of the capillary further includes a conductive tip and wherein the capillary ground contact is connected to the conductive tip. In an example, the interface includes at least one flexible element. In another example, the flexible element includes at least one of rubber, polyurethane, neoprene, and silicone. In yet another example, the sampling device performs capillary electrophoresis or liquid chromatography. In still another example, the analysis system is a mass spectrometer.

In another example of the above aspect, the tip is disposed remote from and above the meniscus.

In another aspect, the technology relates to a method for analyzing a sample, the method including: receiving the sample and a separation solution from a capillary, wherein the capillary has a first end connected to a sampling device and a second end coupled to a capillary ground contact, wherein the sampling device is configured to separate the sample from the separation solution, wherein the sample and the separation solution is received from the second end and into a receiving volume defined at least in part by a transport liquid delivered from a transport liquid supply conduit; aspirating the received sample and the separation solution into a liquid exhaust system in fluidic communication with a removal conduit in fluidic communication with the receiving volume; and analyzing the received sample and separation solution with a mass analysis system. In an example, the method further includes supplying the transport liquid to the transport liquid supply conduit from a transport liquid supply system in fluidic communication with the transport liquid supply conduit. In another example, the receiving volume is defined at least in part by a meniscus. In yet another example, the method further includes receiving the second end of the capillary within the meniscus. In still another example, a perimeter of the second end of the capillary is in contact with the removal conduit.

In another example of the above aspect, the method further includes receiving an interface defining the receiving volume proximate the removal conduit. In an example, the interface includes at least one flexible element. In another example, the sampling device performs at least one of capillary electrophoresis and liquid chromatography to obtain the sample. In yet another example, the method further includes receiving the sample and the separation solution from the capillary, wherein the sample and the separation solution are released from the second end of the capillary under gravity into the receiving volume. In still another example, the separation solution is diluted by the transport liquid to allow for ionization by the mass analysis system.

DETAILED DESCRIPTION

Figure 1:
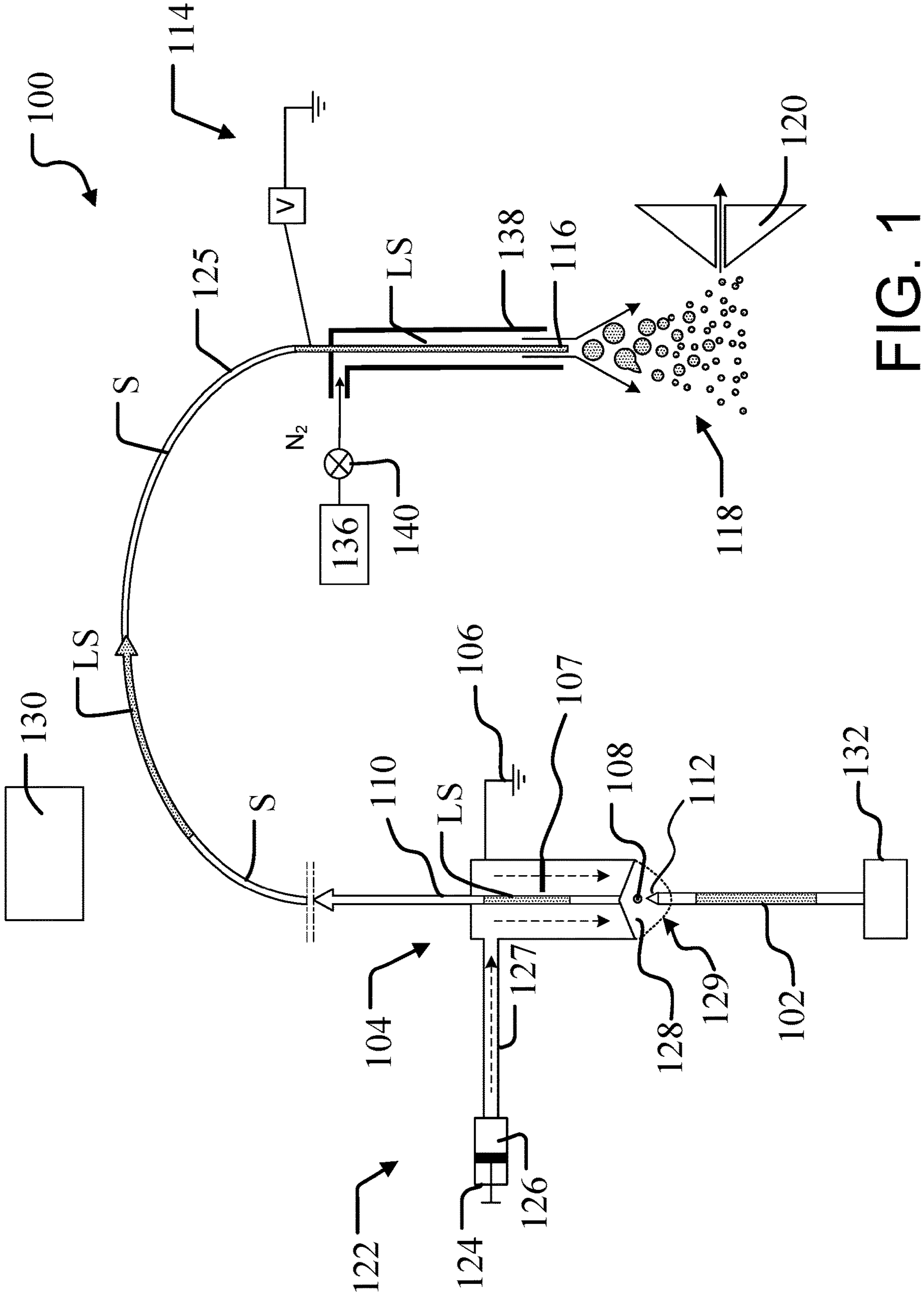
FIG. 1 is a schematic view of an example system combining a sampling device with an open port interface (OPI) sampling interface and an electrospray ionization (ESI) source.

FIG. 1 is a schematic view of an example system 100 combining a capillary 102 connected to a sampling device 132 with an OPI sampling interface 104 and ESI source 114. The system 100 may be a mass analysis instrument such as a mass spectrometry device that is for ionizing and mass analyzing analytes received within an open end of a sampling OPI. Such a system 100 is described, for example, in U.S. Pat. No. 10,770,277, the disclosure of which is incorporated by reference herein in its entirety. The capillary 102 is configured to release or eject an eluent 108, containing separated analytes from a sample in a buffer solution, from an end having a tip 112 into the open end of sampling OPI 104. The capillary 102 is connected at a first end to a sampling device 132, examples of which are described below. As shown in FIG. 1, the example system 100 generally includes the sampling OPI 104 in liquid communication with the ESI source 114 for discharging a liquid containing one or more sample analytes (e.g., via electrospray electrode 116) into an ionization chamber 118, and a mass analyzer detector (depicted generally at 120) in communication with the ionization chamber 118 for downstream processing and/or detection of ions generated by the ESI source 114. Due to the configuration of the nebulizer probe 138 and electrospray electrode 116 of the ESI source 114, samples ejected therefrom are transformed into the gas phase. A transport liquid supply system 122 (e.g., including one or more pumps 124 and one or more conduits 125) provides for the flow of liquid from a transport liquid source or reservoir 126 to the sampling OPI 104 and from the sampling OPI 104 to the ESI source 114. The transport liquid source 126 (e.g., containing a liquid, desorption solvent) can be in fluidic communication with the sampling OPI 104 via a transport liquid supply conduit 127 through which the transport liquid can be delivered at a selected volumetric rate by the pump 124 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example. As discussed in detail below, the flow of liquid into and out of the sampling OPI 104 occurs within a receiving volume 128 defined at least in part by a meniscus 129 accessible at the open end of the sampling OPI 104 such that one or more eluent droplets 108 can be introduced into the receiving volume 128 and subsequently delivered to the ESI source 114. A removal conduit 110 forms one part of a liquid exhaust system that connects the OPI 104 to the ESI 114, and removes the transport liquid and any eluent droplet 108 from the OPI 104. An electrical contact 106 is disposed on the OPI 104 and an electrical conductor 107 connects the outer portion of the OPI 104 (that forms a part of the transport liquid supply conduit 127) to the removal conduit 110 to ensure grounding thereof.

A controller 130 can be operatively coupled to the various components of the system 100 for operation thereof. Controller 130 can be, but is not limited to, a microcontroller, a computer, a microprocessor, or any device capable of sending and receiving control signals and data. Wired or wireless connections between the controller 130 and the remaining elements of the system 100 are not depicted but would be apparent to a person of skill in the art.

As shown in FIG. 1, the ESI source 114 can include a source 136 of pressurized gas (e.g. nitrogen, air, or a noble gas) that supplies a high velocity nebulizing gas flow to the nebulizer probe 138 that surrounds the outlet end of the electrospray electrode 116. As depicted, the electrospray electrode 116 protrudes from a distal end of the nebulizer probe 138. The pressured gas interacts with the liquid discharged from the electrospray electrode 116 to enhance the formation of the sample plume and the ion release within the plume for sampling by mass analyzer detector 120, e.g., via the interaction of the high speed nebulizing flow and jet of a liquid sample LS (e.g., a dilution of the transport fluid S and the eluent received from the sampling device 132). The discrete volumes of liquid samples LS are typically separated from each other by volumes of the transport liquid S. The nebulizer gas can be supplied at a variety of flow rates, for example, in a range from about 0.1 L/min to about 20 L/min, which can also be controlled under the influence of controller 130 (e.g., via opening and/or closing valve 140).

It will be appreciated that the flow rate of the nebulizer gas can be adjusted (e.g., under the influence of controller 130) such that the flow rate of liquid within the sampling OPI 104 can be adjusted based, for example, on suction/aspiration force generated by the interaction of the nebulizer gas and the analyte-solvent dilution as it is being discharged from the electrospray electrode 116 (e.g., due to the Venturi effect). A voltage, e.g., 5 kV, is applied to the electrospray electrode 116 during operation, thus creating an electrical potential between the electrospray electrode 116 and the grounded OPI 104. The ionization chamber 118 can be maintained at atmospheric pressure, though in some examples, the ionization chamber 118 can be evacuated to a pressure lower than atmospheric pressure.

It will also be appreciated by a person skilled in the art and in light of the teachings herein that the mass analyzer detector 120 can have a variety of configurations. Generally, the mass analyzer detector 120 is configured to process (e.g., filter, sort, dissociate, detect, etc.) sample ions generated by the ESI source 114. By way of non-limiting example, the mass analyzer detector 120 can be a triple quadrupole mass spectrometer, or any other mass analyzer known in the art and modified in accordance with the teachings herein. Other non-limiting, exemplary mass spectrometer systems that can be modified in accordance with various aspects of the systems, devices, and methods disclosed herein can be found, for example, in an article entitled "Product ion scanning using a Q-q-Q linear ion trap (Q TRAP) mass spectrometer," authored by James W. Hager and J. C. Yves Le Blanc and published in Rapid Communications in Mass Spectrometry (2003; 17: 1056-1064); and U.S. Pat. No. 7,923,681, entitled "Collision Cell for Mass Spectrometer," the disclosures of which are hereby incorporated by reference herein in their entireties.

Other configurations, including but not limited to those described herein and others known to those skilled in the art, can also be utilized in conjunction with the systems, devices, and methods disclosed herein. For instance, other suitable mass spectrometers include single quadrupole, triple quadrupole, ToF, linear ion traps, 3D traps, electrostatic traps, hybrid analyzers, and other known mass spectrometers. It will further be appreciated that any number of additional elements can be included in the system 100 including, for example, an ion mobility spectrometer (e.g., a differential mobility spectrometer) that is disposed between the ionization chamber 118 and the mass analyzer detector 120 and is configured to separate ions based on their mobility difference between in high-field and low-field). Additionally, it will be appreciated that the mass analyzer detector 120 can comprise a detector that can detect the ions that pass through the analyzer detector 120 and can, for example, supply a signal indicative of the number of ions per second that are detected.

As shown in FIG. 1, the sampling device 132 is interfaced with an OPI 104 to provide a sample introduction system for high-throughput mass spectrometry. In an example, the sampling device 132 performs capillary electrophoresis (CE) and a CE capillary 102 is interfaced with the OPI 104. In other examples, the sampling device 132 performs liquid chromatography (LC) and an LC capillary 102 is interfaced with the OPI 104. When a CE or LC capillary 102 is coupled to a mass analysis instrument 120 via the OPI 104, the system can be referred to as a capillary electrophoresis mass spectrometry (CE-MS) system or a liquid chromatography mass spectrometry (LC-MS) system, respectively. The analytical performance (sensitivity, reproducibility, throughput, etc.) of a CE-MS or LC-MS system depends on the performance of the CE or LC device and the OPI. The performance of the CE or LC device and the OPI depends on selecting the operational conditions or parameters for interfacing these devices. Example operational conditions and parameters for interfacing these devices are described herein below.

Figure 3A:
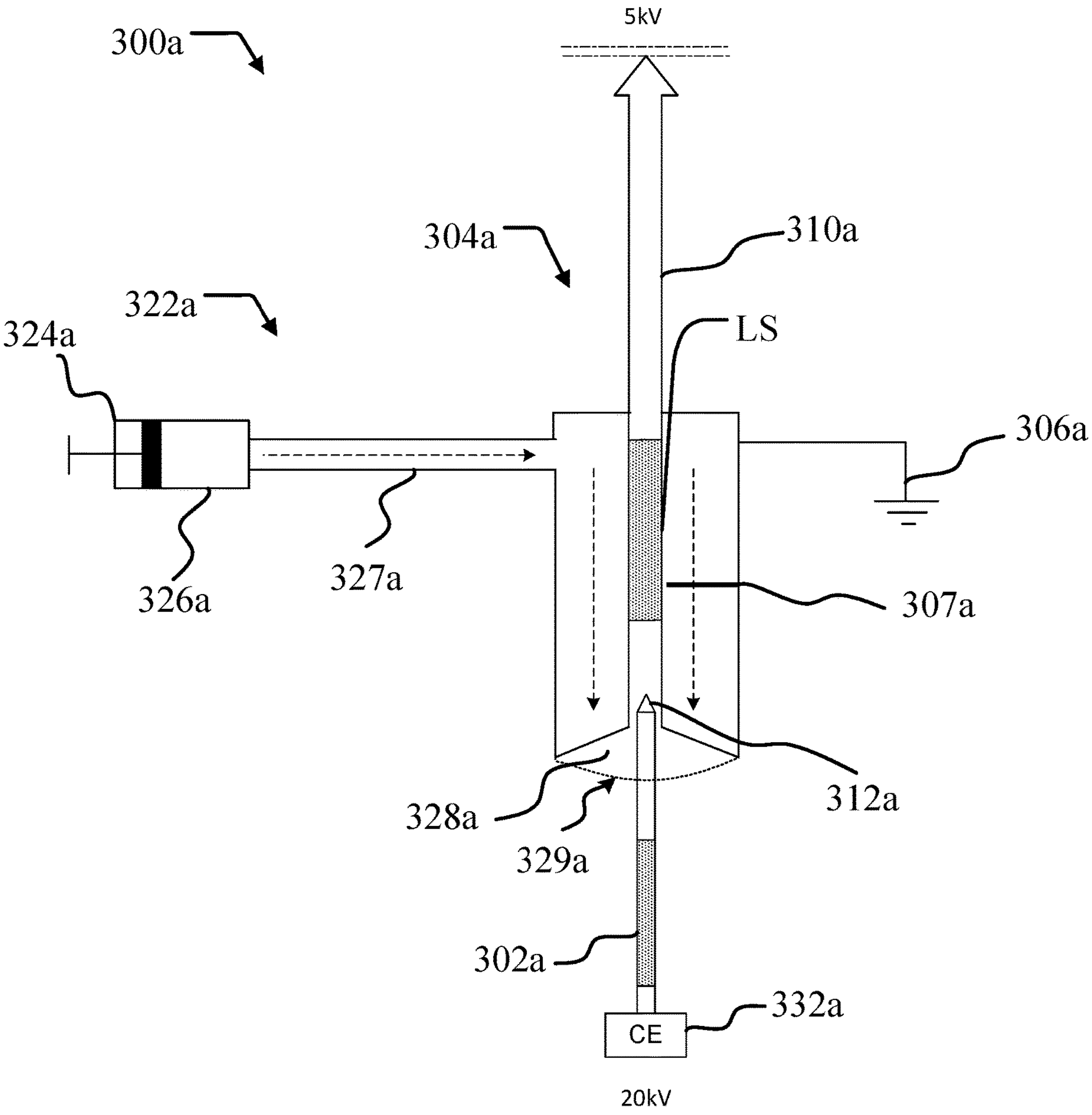
FIG. 3A depicts another enlarged partial view of an example system for analyzing a separated sample from a CE capillary.
Figure 4A:
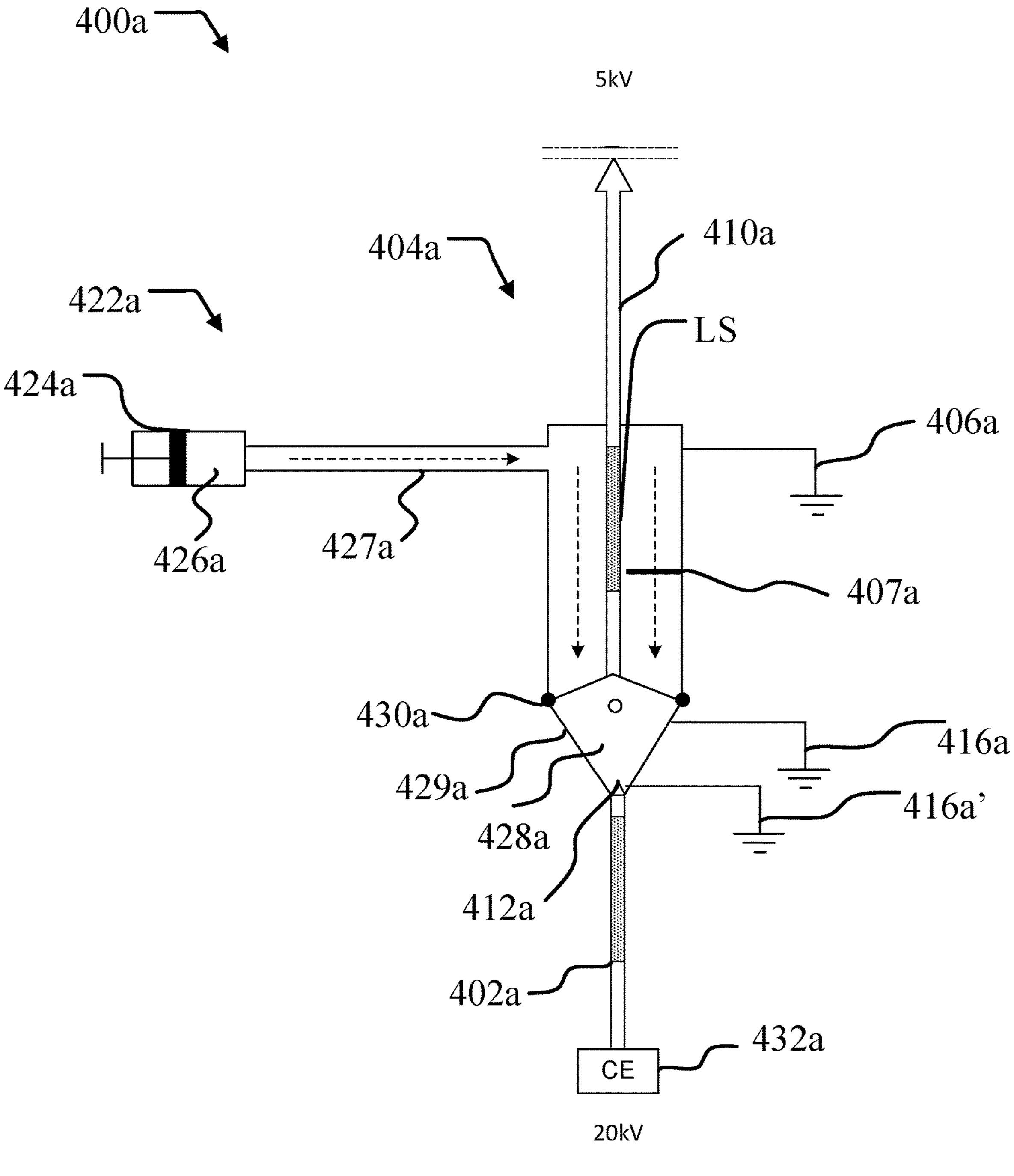
FIG. 4A another enlarged partial view of an example system for analyzing a separated sample from a CE capillary using an interface.
Figure 5A:
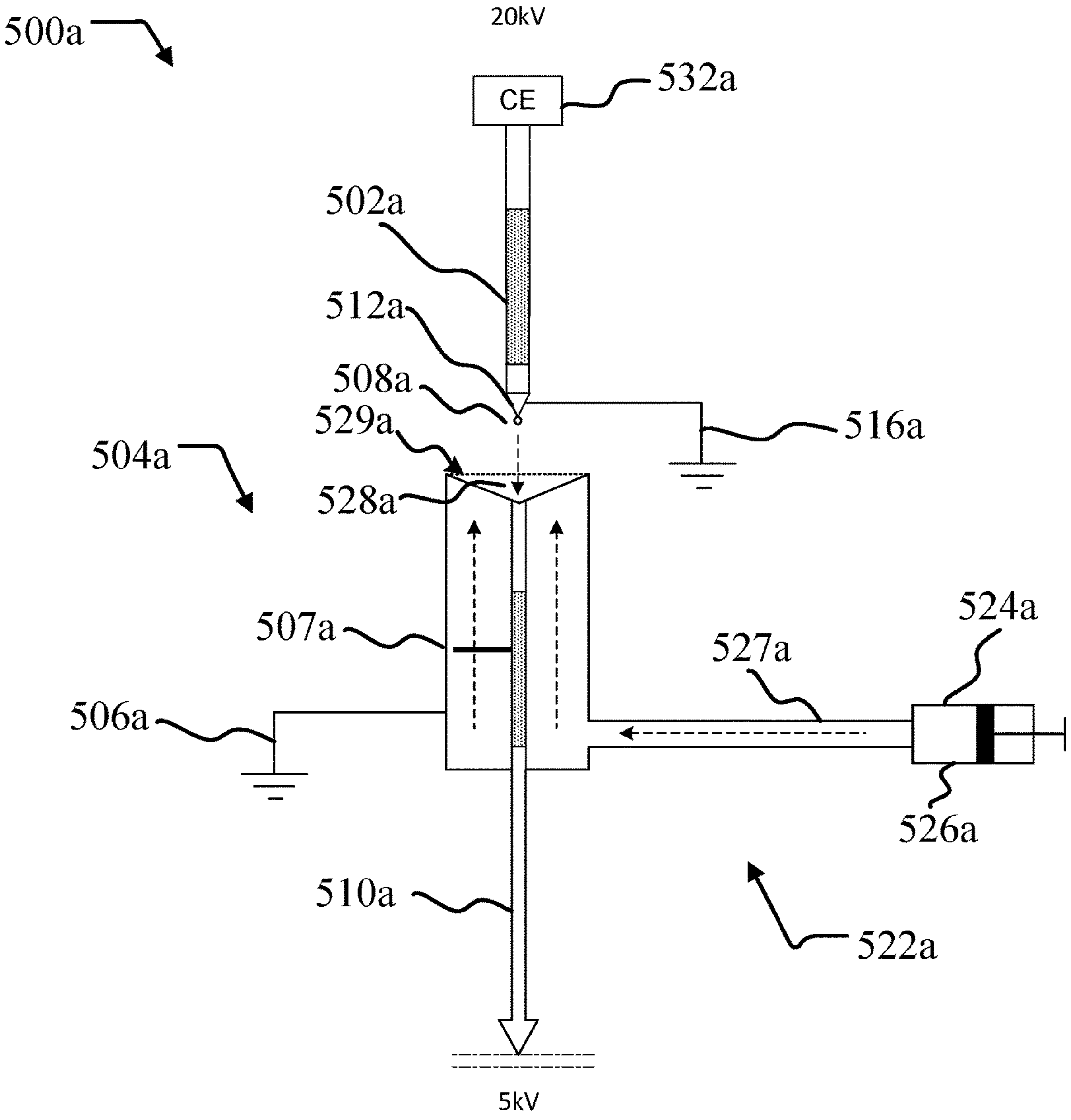
FIG. 5A depicts another enlarged partial view of an example system for analyzing a separated sample from a CE capillary.

The sampling device 132 may be a CE system. CE is a sample separation method that separates analytes within a sample based on electrophoretic mobility. Standard CE systems utilize a fused silica capillary filled with an electrolyte (e.g., a buffer solution). A sample is introduced into a first end of the capillary. In standard systems, the first end of the capillary is placed in contact with an anode buffer solution and a second end is placed in contact with a cathode buffer solution. A high voltage (e.g., 20 kV) is then applied across the capillary to initiate the movement of analytes. The components of the sample move and separate under the influence of the electric field based on differences in electrophoretic mobility. This separated sample may then be delivered to the OPI 104 of the mass spectrometry system 100, as an eluent containing the separated analytes in the buffer solution. FIG. 1 depicts the tip 112 of the capillary 102 disposed below the meniscus 129 of the receiving volume 128. This is but one example configuration and is further depicted and described in FIG. 2A. Other appropriate configurations to enable direct interfacing of a CE system with a mass spectrometry device are depicted in FIGS. 3A, 4A, and 5A. Regardless of configuration, in order to maintain the desired electrical potentials in both the ESI electrode 116 (e.g., 5 kV) and the CE system 132 (e.g., 20 kV) the eluent delivered from the CE system 132 is preferably grounded. Examples of such structure of enable this functionality are depicted and described below and include grounding the CE system via the transport liquid and/or the physical structures within the OPI, or grounding via a dedicated capillary ground contact.

Figure 3B:
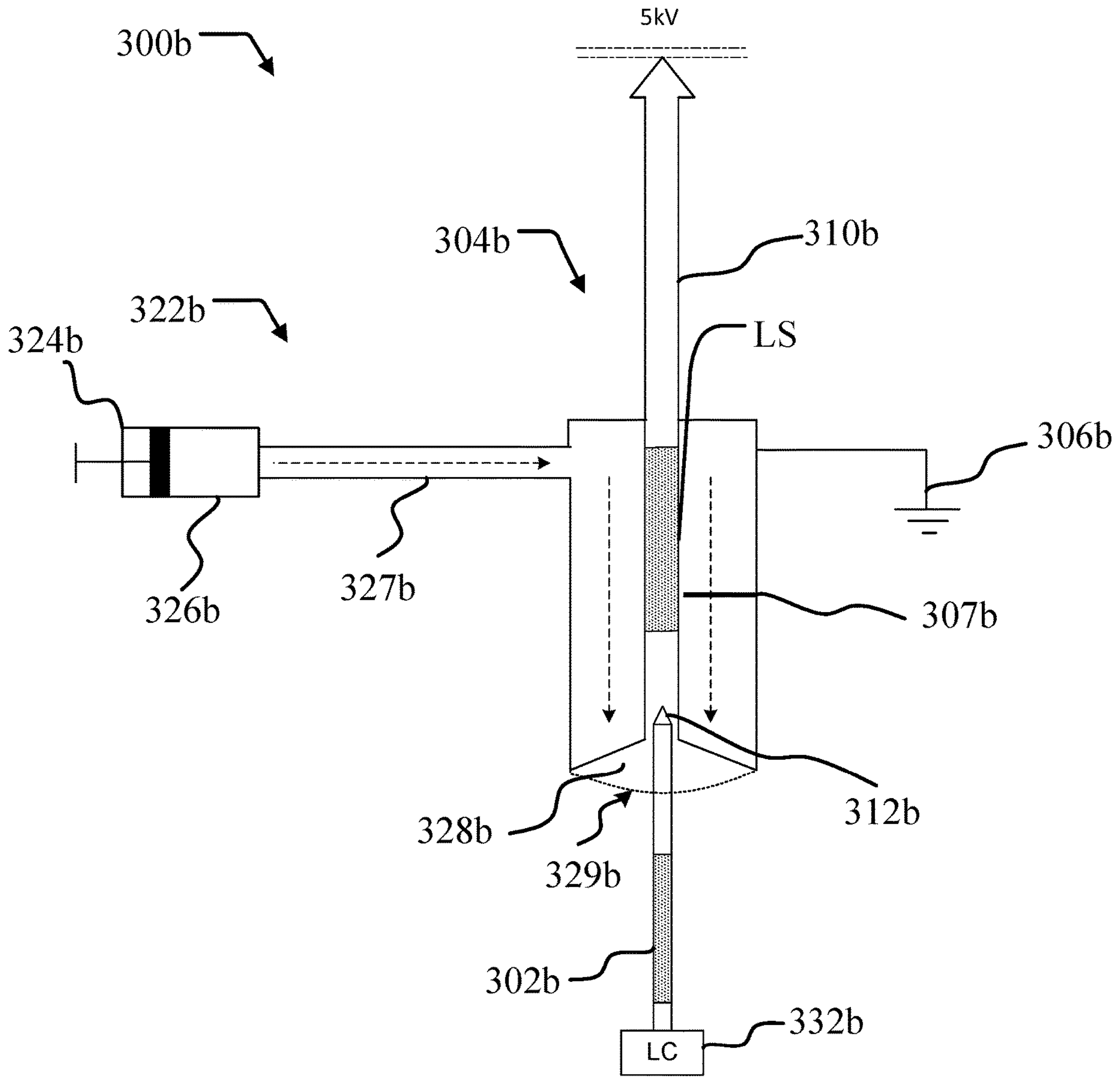
FIG. 3B depicts another enlarged partial view of an example system for analyzing a separated sample from an LC capillary.
Figure 4B:
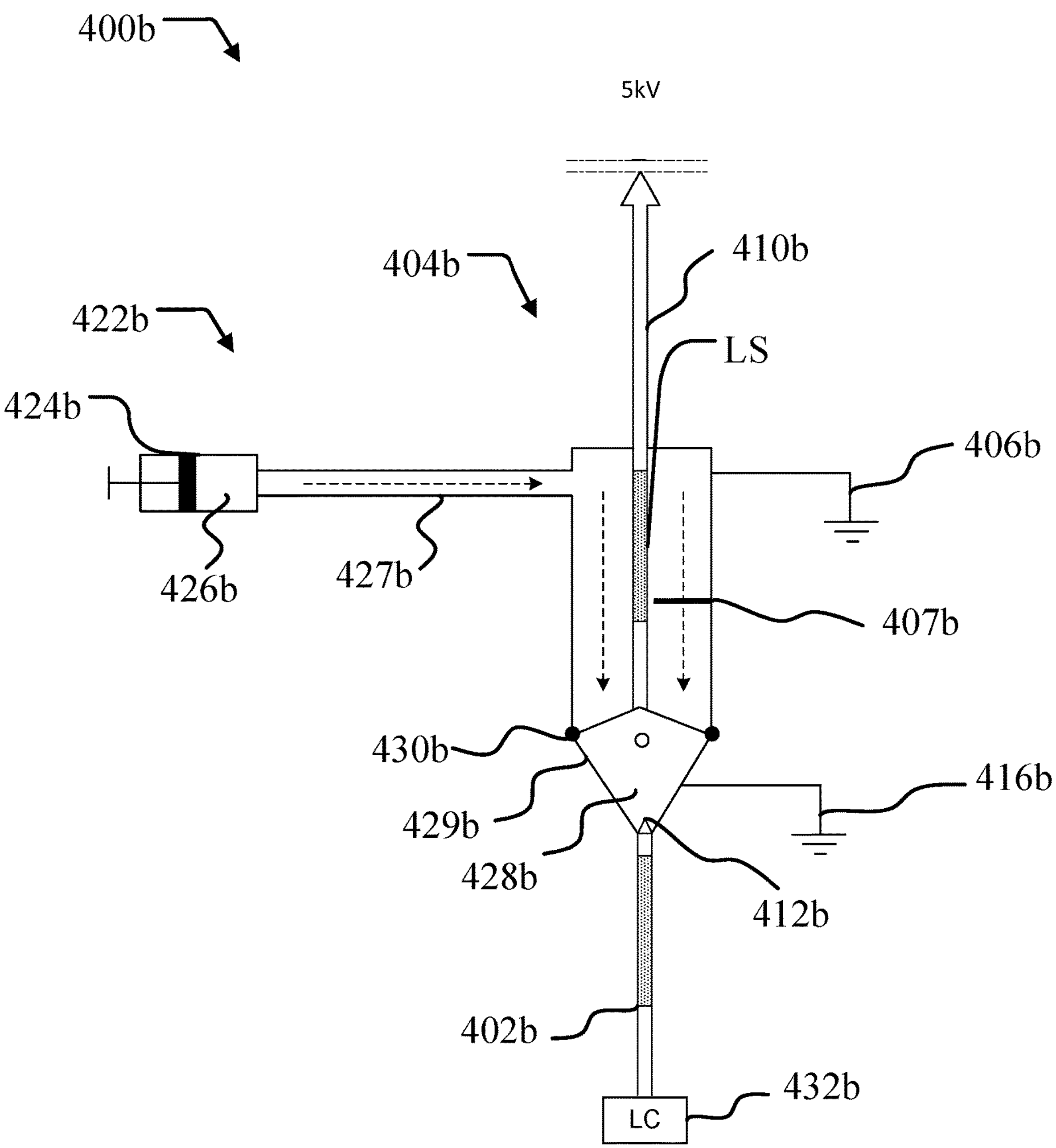
FIG. 4B depicts another enlarged partial view of an example system for analyzing a separated sample from an LC capillary using an interface.
Figure 5B:
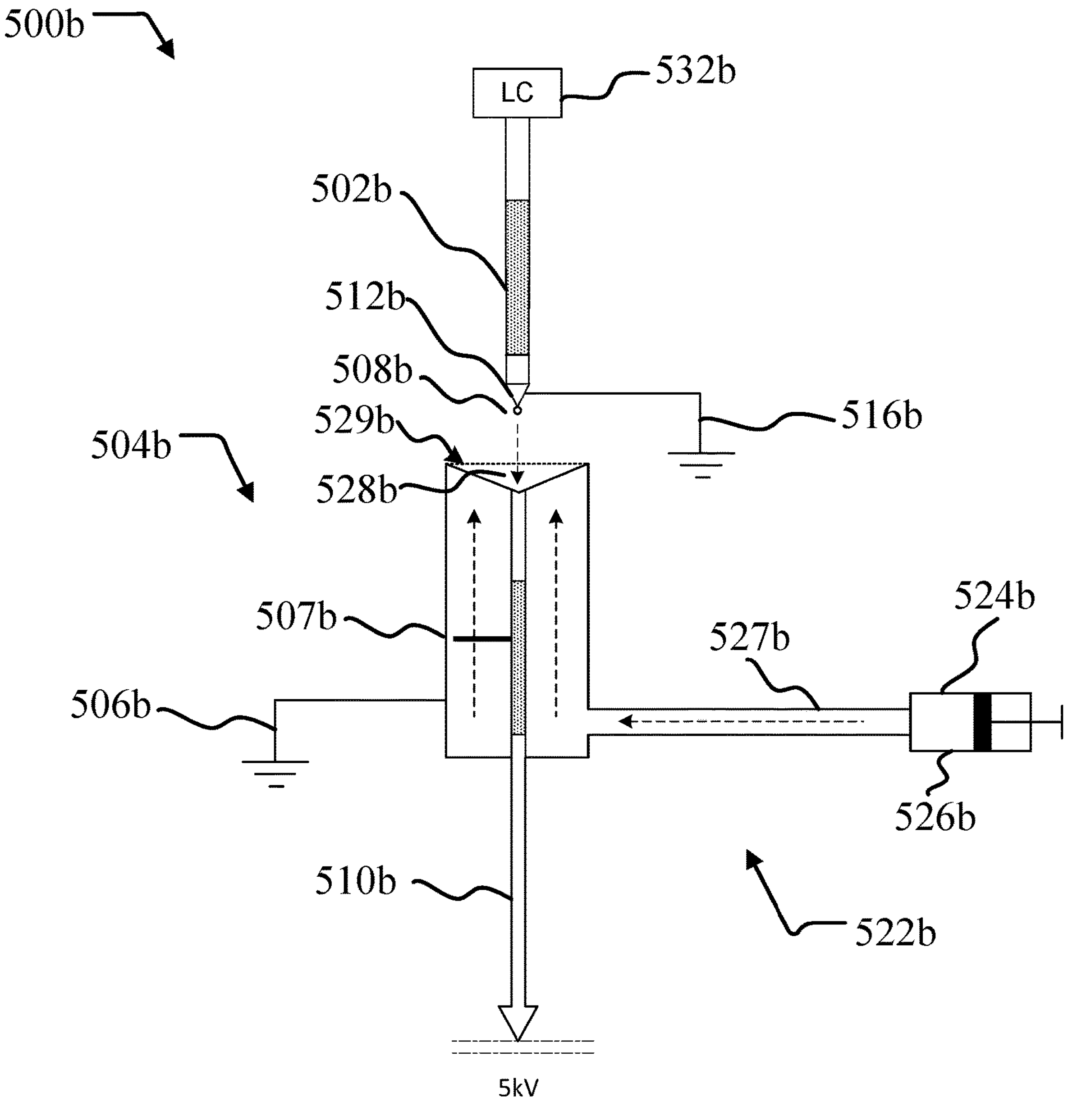
FIG. 5B depicts another enlarged partial view of an example system for analyzing a separated sample from an LC capillary.

The sampling device 132 may be an LC system. LC separates analytes within a sample based on differences in chemical affinity. In standard LC systems, a liquid sample is dissolved in a solvent (e.g., the mobile phase), and then flowed through a system (e.g., a column) containing a stationary phase. The analytes with stronger retention to the stationary phase will take longer to travel through the system, thus causing separation of the sample. The target analytes of the separated sample may then be delivered to the OPI 104 of the mass spectrometry system 100, as described herein. Pressure from the LC system may be used to initiate a controlled flow of an eluent of the separated sample and the solvent from the capillary 102 into the OPI 104. FIG. 1 depicts the tip 112 of the capillary 102 disposed below the meniscus 129 of the receiving volume 128. This is but one example configuration and is further depicted and described in FIG. 2B. Other appropriate configurations to enable direct interfacing of an LC system with a mass spectrometry device are depicted in FIGS. 3B, 4B, and 5B. LC systems can utilize different buffers or solvents, including those that have high conductivity. Such high conductivity liquids are typically incompatible with MS devices. Thus, in the examples depicted herein, the first electrical contact 106 connected to the transport liquid supply conduit grounds the transport liquid, thus enabling a high conductivity buffer to be utilized in the LC system and directly introduced into the OPI 104 for dilution to an extent that avoids ionization suppression in an ion source of the MS system. More specifically, the electrical contact 106 provides a ground that reduces the conductivity of the buffer. This enables an LC system utilizing a high conductivity buffer (e.g., native LC) to be directly interfaced with a MS device through the OPI 104, without further processing of the eluent from the LC system.

Figure 2A:
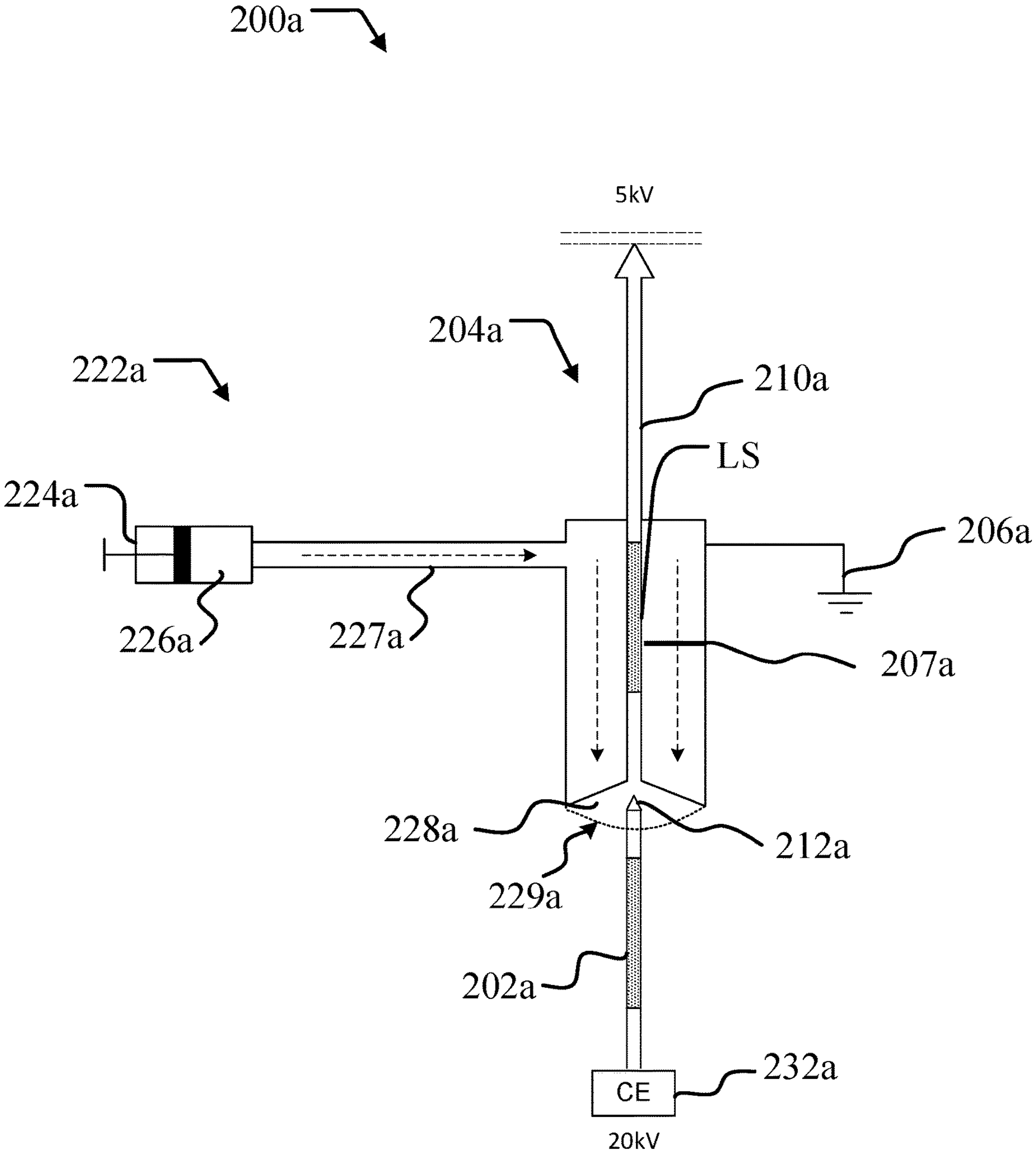
FIG. 2A depicts an enlarged partial view of an example system for analyzing a separated sample from a capillary electrophoresis (CE) capillary.

FIG. 2A depicts an enlarged partial view of an example system 200*a* for analyzing a separated sample from a CE capillary 202*a*. In the system 200*a*, the capillary 202*a* has a first end connected to a CE sampling device 232*a*, and an electric potential (e.g., 20 kV) is applied to the CE sampling device 232*a*. The capillary 202*a* is interfaced with an OPI 204*a* by disposing a second end of the capillary having a tip 212*a* within a receiving volume 228*a* defined at least in part by a meniscus 229*a*. Since the receiving volume 228*a* is open to the atmosphere, the interface between the capillary 202*a* and receiving volume 228*a* may be referred to as an atmospheric pressure liquid junction (APLJ), with a meniscus 229*a* of the transport fluid forming an air-liquid interface. The receiving volume 228*a* completing the electric circuit, for instance by grounding the liquid in the receiving volume 228*a* relative to the electric potential applied at the first end of the CE sampling device 232*a*. The grounding may be applied to a supply source of liquid to the receiving volume 228*a*, a supply conduit, or at the outlet of the OPI 204*a*.

In FIG. 2A, the system 200*a* includes a transport liquid supply system 222*a* having a pump 224*a*, a transport liquid source 226*a*, and a transport liquid supply conduit 227*a*. The pump 224*a* is configured to pump transport liquid from the transport liquid supply source 226*a* into the transport liquid supply conduit 227*a* at a first flow rate. The transport liquid flows through the transport liquid supply conduit 227*a* towards the open end of the OPI 204*a*, where the receiving volume 228*a* defined at least in part by the meniscus 229*a* is formed. The tip 212*a* of the capillary 202*a* is disposed within the receiving volume 228*a* such that the eluent from the capillary 202*a* is released into the receiving volume 228*a*. The eluent from the capillary 202*a* is then removed through the removal conduit 210*a* at a second flow rate. The first flow rate and the second flow rate are configured to allow the transport liquid to form the receiving volume 228*a* at the open end of the OPI 204*a* and then be subsequently removed through the removal conduit 210*a*, without any transport liquid dripping or leaking from the open end of the OPI 204*a*.

The system 200*a* further includes an electrical conductor 207*a* (which may be integrated into the transport liquid supply conduit 227*a* or discrete therefrom) and a first electrical contact 206*a* connected to the transport liquid supply conduit 227*a*. The electrical conductor 207*a* connects the transport liquid supply conduit 227*a* to the removal conduit 210*a*. The first electrical contact 206*a* is configured to ground the solvent liquid, and the electrical conductor 207*a* helps ensure that the removal conduit 210*a* is also grounded. The first electrical contact 206*a* may include a grounding connector, such as a metal clamp, attached to a grounding wire. So long as the tip 212*a* of the capillary 202*a* is in contact with the transport liquid comprising the receiving volume 228*a*, the eluent released from the capillary 202*a* will be grounded via the first electrical contact 206*a*. As will be appreciated, in other examples the transport liquid may be grounded upstream from the OPI 204*a*, such as a supply conduit or liquid source, provided the liquid is sufficiently conductive to provide an effective ground at the receiving volume 228*a*. Thus, the two liquid circuits, e.g., the solvent liquid from the CE sampling device 232*a* and the transport liquid flowing from the OPI 204*a*, are electrically decoupled. This configuration enables the eluent from the CE capillary 202*a* to flow directly into the OPI 204*a* for dilution and transfer of the diluted solution to an electrospray ionization source of the mass analysis system, while isolating and maintaining the required potentials on the CE system (e.g., 20 kV) and on the electrospray electrode of the mass analysis system (e.g., 5 kV).

In another example of the configuration depicted in FIG. 2A, the transport liquid supply conduit 227*a* and discrete pump 224*a* may be eliminated. Such a configuration is depicted and described in the Appendix, the disclosure of which is hereby incorporated by reference herein in its entirety. Transport liquid is still required for proper operation of the OPI 204*a*, however, so buffer liquid may be introduced from an outlet vial of the CE sampling device 232*a*. This buffer liquid is introduced under pressure to the OPI 204*a* at a junction separate from the sample capillary 202*a*. The buffer liquid may be grounded anywhere along the flow path to the OPI 204*a* or APLJ; in FIG. 1 of the Appendix, the ground is depicted just before introduction of the buffer liquid to the APLJ. FIG. 1 of the Appendix also depicts an isolation transformer, which may be utilized if the CE sampling device 232*a* and mass analysis system utilize a common power supply, to electrically decouple those two components. As will be appreciated by the person of skill in the art, a separate isolation transformer may not be required depending upon the type and configuration of the power supply supporting the mass analysis system, or if separate power supplies are utilized.

Figure 2B:
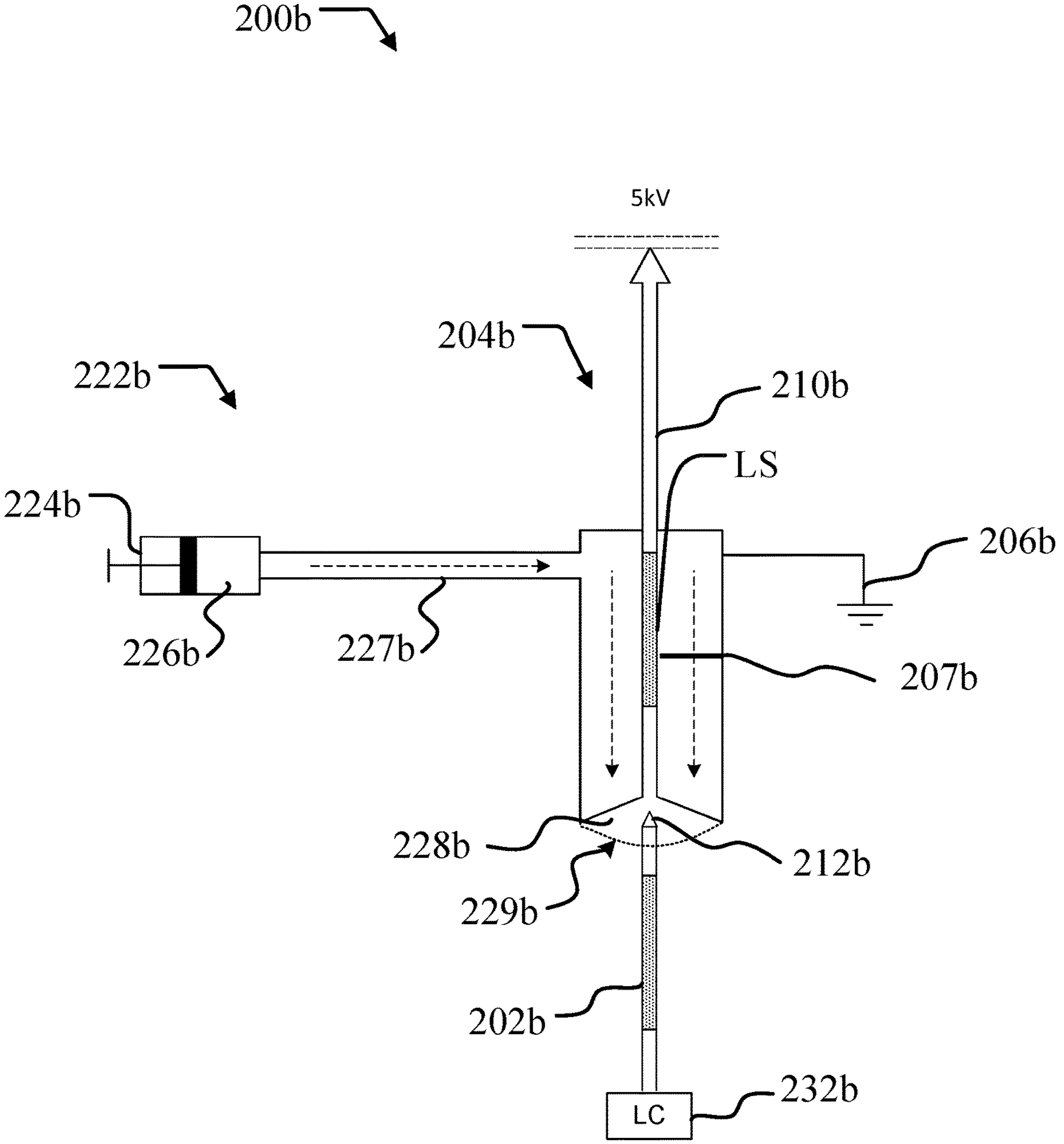
FIG. 2B depicts an enlarged partial view of an example system for analyzing a separated sample from a liquid chromatography (LC) capillary.

FIG. 2B depicts an enlarged partial view of an example system 200*b* for analyzing a separated sample from an LC capillary 202*b*. A number of features are described above in the context of FIG. 2A and as such are not necessarily described further, but are numbered consistently herein for clarity. In general, the system 200*b* includes a transport liquid supply system 222*b* having a pump 224*b*, a transport liquid source 226*b*, and a transport liquid supply conduit 227*b*. The system 200*b* further includes an electrical conductor 207*b* for connecting the transport liquid supply conduit 227*b* to the removal conduit 210*b*, and a first electrical contact 206*b* connected to the transport liquid supply conduit 227*b*. The first electrical contact 206*b* and the electrical conductor 207*b* ensure that the transport liquid and removal conduit 210*b* are grounded. The LC capillary 202*b* is interfaced with an OPI 204*b* by disposing a second end of the capillary 202*b* having a tip 212*b* within a receiving volume 228*b* defined at least in part by a meniscus 229*b*. By disposing the tip 212*b* within the receiving volume 228*b*, the eluent released from the LC capillary 202*b* will be grounded. Thus, high conductivity liquids, which are typically incompatible with standard MS systems, may be used in the LC-MS system described herein, because the electrical contact 206*b* reduces the ionization suppression from the high concentration eluent discharged from the LC system and permits direct introduction of the eluent (now diluted in the transport liquid) into the OPI 204*b* without interfering with the separation operation of the LC system. This configuration enables the diluted eluent from the LC capillary 202*b* to flow directly through the OPI 204*b* to the electrospray electrode of the mass analysis system.

FIG. 3A depicts another enlarged partial view of an example system 300*a* for analyzing a separated sample from a CE capillary 302*a*. A number of features are described above in the context of FIG. 2A and as such are not necessarily described further, but are numbered consistently herein for clarity. In general, the system 300*a* includes a transport liquid supply system 322*a* having a pump 324*a*, a transport liquid source 326*a*, and a transport liquid supply conduit 327*a*. The system 300*a* further includes an electrical conductor 307*a* for connecting the transport liquid supply conduit 327*a* to the removal conduit 310*a*, and a first electrical contact 306*a* connected to the transport liquid supply conduit 327*a*. The first electrical contact 306*a* and the electrical conductor 307*a* ensure that the transport liquid and removal conduit 310*a* are grounded. The system 300*a* further includes a receiving volume 328*a* defined at least in part by a meniscus 329*a*. The CE capillary 302*a* is interfaced with an OPI 304*a* by disposing a second end of the capillary 302*a* having a tip 312*a* within the removal conduit 310*a*. The capillary 302*a* may be spaced apart from the removal conduit 310*a* such that there is no direct contact between the capillary 302*a* and the removal conduit 310*a*. Alternatively, the capillary 302*a* may be in contact with the removal conduit 310*a* so long as the contact does not completely block the flow of transport liquid through the removal conduit 310*a*. In either configuration, by disposing the tip 312*a* of the capillary 302*a* within the removal conduit 310*a*, the capillary is in contact with the transport liquid and the eluent from the capillary 302*a* is therefore grounded via the first electrical contact 306*a*. The capillary 302*a* is sized so as to provide sufficient space between the capillary 302*a* and the removal conduit 310*a* to enable flow of the transport liquid. This configuration enables the eluent from the CE capillary 302*a* to be diluted in the transport liquid and flow directly through the OPI 304*a* to the mass analysis system, while maintaining the required potential on the CE system (e.g., 20 kV) and on electrospray electrode of the mass analysis system (e.g., 5 kV).

FIG. 3B depicts another enlarged partial view of an example system 300*b* for analyzing a separated sample from an LC capillary 302*b*. A number of features are described above in the context of FIG. 2A and, as such are not necessarily described further, but are numbered consistently herein for clarity. In general, the system 300*b* includes a transport liquid supply system 322*b* having a pump 324*b*, a transport liquid source 326*b*, and a transport liquid supply conduit 327*b*. The system 300*b* further includes an electrical conductor 307*b* for connecting the transport liquid supply conduit 327*b* to the removal conduit 310*b*, and a first electrical contact 306*b* connected to the transport liquid supply conduit 327*b*. The first electrical contact 306*b* and the electrical conductor 307*b* ensure that the transport liquid and removal conduit 327*b* are grounded. The system 300*b* further includes a receiving volume 328*b* defined at least in part by a meniscus 329*b*. The LC capillary 302*b* is interfaced with an OPI 304*b* by disposing a second end of the capillary 302*b* having a tip 312*b* within the removal conduit 310*b*. The capillary 302*b* may be spaced apart from the removal conduit 310*b* or in contact therewith, provide transport liquid flow is maintained, as noted above with regard to FIG. 3A. By disposing the tip 312*b* of the capillary 302*b* within the removal conduit 310*a*, the capillary is in contact with the transport liquid and the eluent from the capillary 302*b* is therefore grounded via the first electrical contact 306*b*. Thus, high conductivity liquids, which are typically incompatible with standard MS systems, may be used in the LC-MS system described herein, because the electrical contact 306*b* reduces the ionization suppression from the high concentration eluent discharged from the LC system, thus making it compatible with the mass analysis system. This configuration enables the eluent from the LC capillary 302*b* to be diluted in the transport liquid and flow directly through the OPI 304*b* to the mass analysis system.

FIG. 4A depicts another enlarged partial view of an example system 400*a* for analyzing a separated sample from a CE capillary 402*a* utilizing, in this case, using a physical interface or connector 429*a* that may be secured to the OPI 404*a* via a conductive or non-conductive flexible fastener or gasket 430*a*. A number of features are described above in the context of FIG. 2A and, as such are not necessarily described further, but are numbered consistently herein for clarity. In general, the system 400*a* includes a transport liquid supply system 422*a* having a pump 424*a*, a transport liquid source 426*a*, and a transport liquid supply conduit 427*a*. The system 400*a* further includes an electrical conductor 407*a* for connecting the transport liquid supply conduit 427*a* to the removal conduit 410*a*, and a first electrical contact 406*a* connected to the transport liquid supply conduit 427*a*. The first electrical contact 406*a* and the electrical conductor 407*a* ensure that the transport liquid and removal conduit 410*a* are grounded. The CE capillary 402*a* is connected to an OPI 404*a* by the interface 429*a*, which is coupled to the transport liquid supply conduit 427*a* and the second end of the capillary 402*a*. The interface 429*a* defines a receiving volume 428*a* proximate the removal conduit 410*a*, and thus, is configured to receive transport liquid from the transport liquid supply conduit 427*a*. The interface 429*a* is further configured to be communicatively coupled with at least a tip 412*a* of the second end of the capillary 402*a*, e.g., via an inlet. In this example system 400*a*, the transport liquid floods the interface 429*a*. The eluent from the capillary 402*a* can then be received into the receiving volume 428*a* defined by the interface 429*a*, diluted in the transport liquid, and removed via the removal conduit 410*a*.

The interface 429*a* and/or fastener 430*a* may be conductive or non-conductive. Examples of a nonconductive interfaces 429*a* include, but are not limited to, a tube, chamber, or conduit comprising a non-conductive material, such as rubber or plastic. Examples of a conductive interface 429*a* include, but are not limited to, a tube, chamber, or conduit comprising a conductive material, such as a conductive metal (e.g., copper, aluminum, steel). Depending on the conductivity of the interface 429*a* and/or the fastener 430*a*, additional grounding conductors may be required to maintain the required potential on the CE system (e.g., 20 kV) and on the electrospray electrode of the mass analysis system (e.g., 5 kV) as the OPI between the CE system and the ESI electrically isolate the CE system from the mass analysis system (e.g., a fused glass silica capillary is an insulator between the OPI and the ESI). The CE system applies a voltage, positive or negative, at one end, and a counter electrode applies a second voltage at the other end coupled to the interface 429*a*, which must be consistent with the voltage applied at the open end of the OPI 404*a* to maintain a well-defined voltage drop across the CE capillary. In examples, the fastener 430*a* may be a solid gasket, a chemical adhesive, or an adhesive wrap or tape. The interface 429*a* may include at least one flexible element or be made in whole or in part from at least one of rubber, polyurethane, neoprene, or silicone. Other fastener 430*a* configurations will be apparent to a person of skill in the art. Use of a non-conductive fastener 430*a* with a conductive fastener 429*a* requires a second electrical contact 416*a* is disposed on the interface 429*a* to maintain the potential required in the CE system. If the interface 429*a* itself is non-conductive, a second electrical contact 416*a*' should be connected to the tip 412*a*. In examples where the interface 429*a* is conductive, the first electrical contact 406*a* is sufficient to ground the eluent from the capillary 402*a*, so any second electrical contact 416*a*' is optional, but may be desirable.

FIG. 4B depicts another enlarged partial view of an example system 400*b* for analyzing a separated sample from an LC capillary 402*b* using an interface 429*b* connected via a fastener 430*b*. A number of features are described above in the context of FIGS. 2A and 4A and, as such are not necessarily described further, but are numbered consistently herein for clarity. In general, the system 400*b* includes a transport liquid supply system 422*b* having a pump 424*b*, a transport liquid source 426*b*, and a transport liquid supply conduit 427*b*. The system 400*b* further includes an electrical conductor 407*b* for connecting the transport liquid supply conduit 427*b* to the removal conduit 410*b*, and a first electrical contact 406*b* connected to the transport liquid supply conduit 427*b*. The LC capillary 402*b* is connected to an OPI 404*b* by the interface 429*b*, which is coupled to the transport liquid supply conduit 427*b* and the second end of the capillary 402*b*. The eluent from the capillary 402*b* is received by the receiving volume 428*b* defined by the interface 429*b*, diluted in the transport liquid to reduce the ionization suppression from the high concentration eluent discharged from the LC system, and removed via the removal conduit 410*b*. Configurations and materials for the interface 429*b* and fastener 430*b*, as well as requirements for electrical contacts 416*b* in view thereof, are described above in the context of FIG. 4A.

FIG. 5A depicts another enlarged partial view of an example system 500*a* for analyzing a separated sample from a CE capillary 502*a*; FIG. 5A is another configuration of the APLJ first depicted in FIG. 2A, but where a tip 512*a* of the sample capillary 502*a* is located within the atmosphere (e.g., air side of the APLJ) about the OPI 504*a*, rather than within a receiving volume 528*a* (liquid side of the APLJ) thereof. Although the OPI 504*a* is inverted compared to the previous examples, the components utilized therein are consistent. Thus, a number of features are described above in the context of FIG. 2A and as such are not necessarily described further, but are numbered consistently for clarity. In general, the system 500*a* includes a transport liquid supply system 522*a* having a pump 524*a*, a transport liquid source 526*a*, and a transport liquid supply conduit 527*a*. The system 500*a* further includes an electrical conductor 507*a* for connecting the transport liquid supply conduit 527*a* to the removal conduit 510*a*, and a first electrical contact 506*a* connected to the transport liquid supply conduit 527*a*. The first electrical contact 506*a* and the electrical conductor 507*a* ensure that the transport liquid and removal conduit 510*a* are grounded.

In the example system 500*a*, one end of the capillary 502*a* has a conductive tip 512*a* that is positioned remote from and above the open end of the OPI 504*a*. A droplet 508*a* eluent from the capillary 502*a* can be released from the tip 512*a* under gravity into a receiving volume 528*a* defined at least in part by a meniscus 529*a*. Since the tip 512*a* of the capillary 502*a* is disposed remote from and above the receiving volume 528*a*, a second electrical contact 516*a* connected to the conductive tip 512*a* is required to maintain potential on the CE system. Thus, when the eluent droplet 508*a* is released from the tip 512*a* of the capillary 512*a*, the eluent 508*a* is grounded via the second electrical contact 516*a*. The eluent is diluted in the transport liquid and then removed via the removal conduit 510*a* to the mass analysis system.

FIG. 5B depicts another enlarged partial view of an example system 500*b* for analyzing a separated sample from an LC capillary 502*b*. A number of features are described above in the context of FIGS. 2A and 5A and as such are not necessarily described further, but are numbered consistently herein for clarity. In general, the system 500*b* includes a transport liquid supply system 522*b* having a pump 524*b*, a transport liquid source 526*b*, and a transport liquid supply conduit 527*b*. The system 500*b* further includes an electrical conductor 507*b* for connecting the transport liquid supply conduit 527*b* to the removal conduit 510*b*, and a first electrical contact 506*b* connected to the transport liquid supply conduit 527*b*. The first electrical contact 506*b* and the electrical conductor 507*b* ensure that the transport liquid and removal conduit 527*b* are grounded. The capillary 502*b* includes a conductive tip 512*b* positioned remote from and above the open end of the OPI 504*b*. A droplet of eluent 508*b* from the capillary 502*b* can be released from the tip 512*b* under gravity into a receiving volume 528*b* defined at least in part by a meniscus 529*b*. A second electrical contact 516*b* connected to the conductive tip 512*b*; thus, when the eluent droplet 508*b* is released from the tip 512*b* of the capillary 502*b*, the eluent 508*b* is grounded via the second electrical contact 516*b*. Thus, high conductivity liquids, which are typically incompatible with standard MS systems, may be used in the LC-MS system described herein, because the electrical contact 516*b* reduces the ionization suppression from the high concentration eluent discharged from the LC system prior to entering the MS system via the removal conduit 510*b*.

Figure 6:
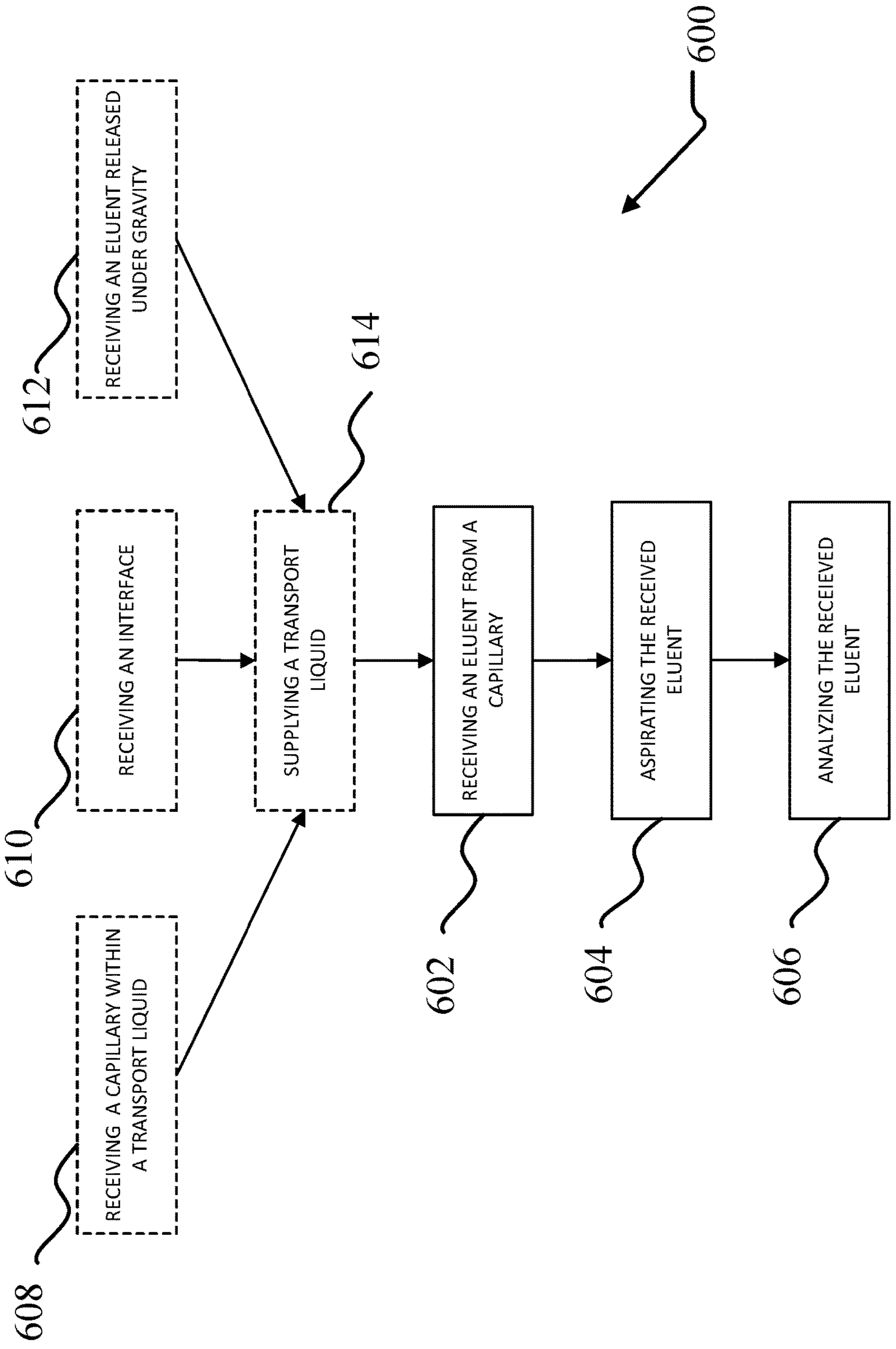
FIG. 6 depicts a method for analyzing a separated sample.

FIG. 6 depicts a method 600 for analyzing a separated sample received from a capillary. The capillary has a first end connected to a sampling device that performs either capillary electrophoresis (CE) or liquid chromatography (LC). Example systems for connecting a CE or LC sampling device are described above, for example, in FIGS. 2A-5B. The method 600 includes receiving an eluent (e.g., separated sample and solvent) from the capillary, operation 602. The eluent is received into a receiving volume defined at least in part by a transport liquid and diluted in the transport liquid. The receiving volume may be defined at least in part by a meniscus. In advance of performing operation 602, the method 600 may include supplying the transport liquid to a transport liquid supply conduit, operation 614. The transport liquid is supplied from a transport liquid supply system, which is in fluidic communication with the transport liquid supply conduit. The transport liquid flows from a transport liquid source through the transport liquid supply conduit towards an open end of an OPI, where the receiving volume is formed. A first electrical contact is connected to the transport liquid supply conduit to ground the transport liquid. The received diluted eluent is then aspirated into a liquid exhaust system, operation 604. The liquid exhaust system is in fluidic communication with a removal conduit configured to remove liquid from the receiving volume. The liquid exhaust system is described above, for example, in FIG. 1. The method continues with analyzing the received diluted eluent with a mass analysis system, operation 606.

The capillary from which the eluent is received in operation 602 may be arranged in one of a variety of example configurations, as described above in FIGS. 2A-5B. In one example, the method 600 includes receiving the second end of the capillary within the meniscus, operation 608. The second end of the capillary may be disposed within the transport liquid and outside of the removal conduit, such as in the example systems shown in FIGS. 2A and 2B. Alternatively, the second end of the capillary may be disposed within the removal conduit, such as in the example systems shown in FIGS. 3A and 3B. In these examples, the perimeter of the second of the capillary may be in contact with the removal conduit. However, the contact between the second end of the capillary and the removal conduit must be configured to allow transport liquid to flow from the receiving volume into the removal conduit.

In a second example, the method 600 includes receiving an interface defining the receiving volume proximate the removal conduit, operation 610. The interface is coupled to the transport liquid supply conduit and the second end of the capillary. Thus, once the interface is received, operation 610, an eluent from the capillary can be received, operation 602, into the interface defining the receiving volume. As described above, the interface may include at least one flexible element and may be connected to a second electrical contact. Example systems utilizing the interface received in operation 610 are described herein above, for example, in FIGS. 4A and 4B. In a third example, the method 600 includes receiving an eluent from the capillary where the eluent is released from the second end of the capillary under gravity into the receiving volume, operation 612. Example systems consistent with operation 612 are described above, for example, in FIGS. 5A and 5B. The second end of the capillary is positioned remote from and above the receiving volume such that gravity causes droplets of the eluent to be released from the tip of the capillary. Since the capillary is not in direct contact with the receiving volume, a second electrical contact is disposed on the tip of the capillary and configured to ground the eluent as it is released from the second end of the capillary.

Figure 7:
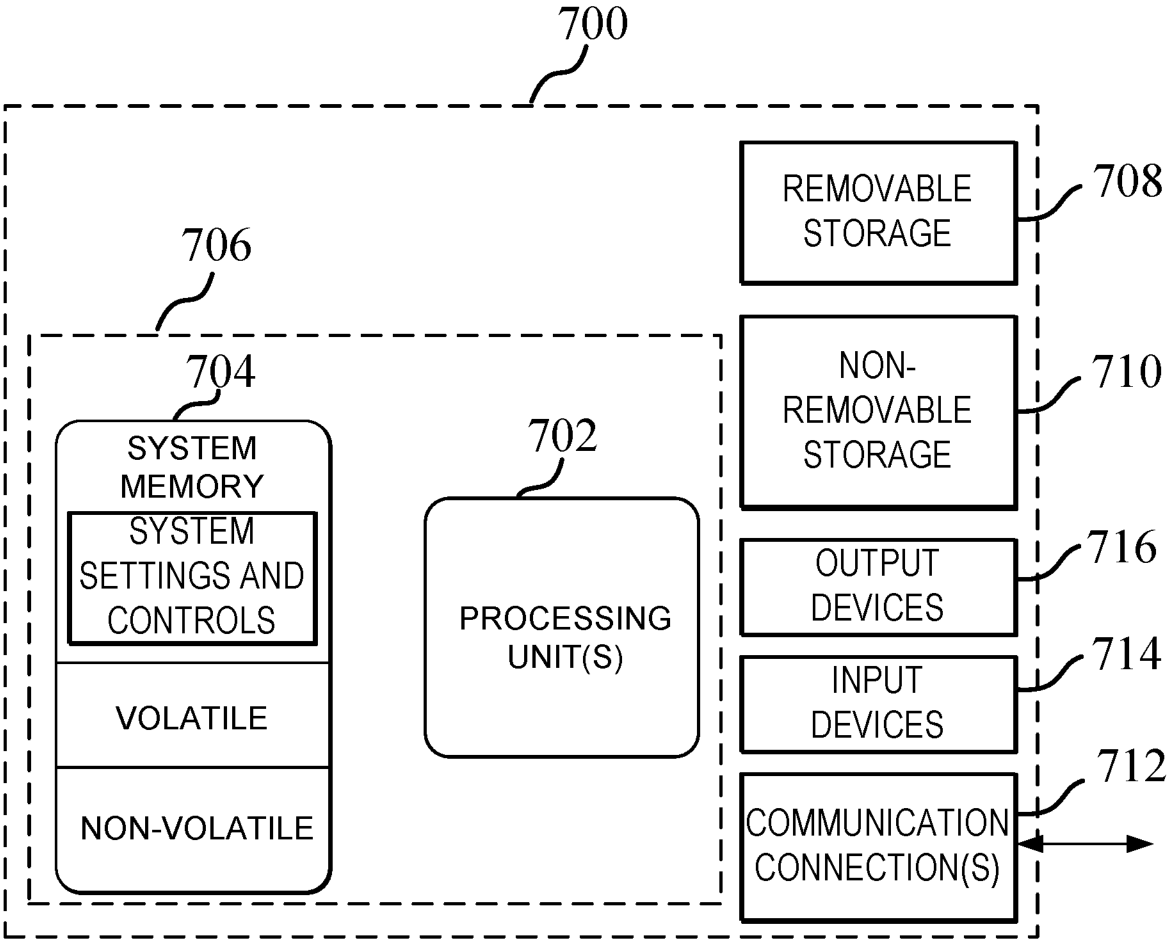
FIG. 7 depicts an example of a suitable operating environment in which one or more of the present examples can be implemented.

FIG. 7 depicts one example of a suitable operating environment 700 in which one or more of the present examples can be implemented. This operating environment may be incorporated directly into the controller for a mass spectrometry system, e.g., such as the controller depicted in FIG. 1. The controller may further interface with a CE or LC system that supplies eluents to the OPI. This is only one example of a suitable operating environment and is not intended to suggest any limitation as to the scope of use or functionality. Other well-known computing systems, environments, and/or configurations that can be suitable for use include, but are not limited to, personal computers, server computers, hand-held or laptop devices, multiprocessor systems, microprocessor-based systems, programmable consumer electronics such as smart phones, network PCs, minicomputers, mainframe computers, tablets, distributed computing environments that include any of the above systems or devices, and the like.

In its most basic configuration, operating environment 700 typically includes at least one processing unit 702 and memory 704. Depending on the exact configuration and type of computing device, memory 704 (storing, among other things, instructions to control the sampling device, release of eluent from the capillary, liquid flow rates, interface operation of the CE or LC with that of the MS, etc., or perform other methods disclosed herein) can be volatile (such as RAM), non-volatile (such as ROM, flash memory, etc.), or some combination of the two. This most basic configuration is illustrated in FIG. 7 by dashed line 706. Further, environment 700 can also include storage devices (removable, 708, and/or non-removable, 710) including, but not limited to, magnetic or optical disks or tape. Similarly, environment 700 can also have input device(s) 714 such as touch screens, keyboard, mouse, pen, voice input, etc., and/or output device (s) 716 such as a display, speakers, printer, etc. Also included in the environment can be one or more communication connections 712, such as LAN, WAN, point to point, Bluetooth, RF, etc.

Operating environment 700 typically includes at least some form of computer readable media. Computer readable media can be any available media that can be accessed by processing unit 702 or other devices having the operating environment. By way of example, and not limitation, computer readable media can include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. A computer-readable device is a hardware device incorporating computer storage media.

The operating environment 700 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some examples, the components described herein include such modules or instructions executable by computer system 700 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some examples, computer system 700 is part of a network that stores data in remote storage media for use by the computer system 700.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed:

1. A system comprising:

a capillary having a first end connected to a sampling device and a second end, wherein the sampling device is configured to separate a sample with a separation solution and deliver the sample and the separation solution to the second end, wherein the second end is coupled to a capillary ground contact;

a transport liquid supply system in fluidic communication with a transport liquid supply conduit that provides a transport liquid from a transport liquid source through the transport liquid supply conduit, wherein the transport liquid provided from the transport liquid supply conduit comprises a receiving volume defined at least in part by a meniscus, and wherein the second end of the capillary is in fluidic communication with the receiving volume;

a liquid exhaust system in fluidic communication with a removal conduit that removes liquid from the receiving volume;

an electrical conductor for connecting the transport liquid supply conduit to the removal conduit;

a first electrical contact connected to the transport liquid supply conduit; and an analysis system in fluidic communication with the removal conduit.

2. The system of claim 1, wherein the second end of the capillary is disposed within the meniscus and wherein the capillary ground contact comprises at least in part the receiving volume.

3. The system of claim 1, wherein the second end of the capillary is disposed in the removal conduit and wherein the capillary ground contact comprises at least in part the receiving volume.

4. The system of claim 1, wherein a perimeter of the second end of the capillary is spaced apart from the removal conduit.

5. The system of claim 1, further comprising an interface coupled to the transport liquid supply conduit and the second end of the capillary, wherein the interface defines the receiving volume proximate the removal conduit.

6. The system of claim 1, wherein the second end of the capillary further comprises a conductive tip and wherein the capillary ground contact is connected to the conductive tip.

7. The system of claim 5, wherein the interface comprises at least one flexible element and optionally wherein the flexible element comprises at least one of rubber, polyurethane, neoprene, and silicone.

8. The system of claim 1, wherein the sampling device performs capillary electrophoresis or liquid chromatography.

9. The system of claim 1, wherein the analysis system is a mass spectrometer.

10. The system of claim 6, wherein the tip is disposed remote from and above the meniscus.

11. A method for analyzing a sample, the method comprising:

receiving the sample and a separation solution from a capillary, wherein the capillary has a first end connected to a sampling device and a second end coupled to a capillary ground contact, wherein the sampling device is configured to separate the sample from the separation solution, wherein the sample and the separation solution is received from the second end and into a receiving volume defined at least in part by a transport liquid delivered from a transport liquid supply conduit;

aspirating the received sample and the separation solution into a liquid exhaust system in fluidic communication with a removal conduit in fluidic communication with the receiving volume;

electrically connecting the transport liquid supply conduit to the removal conduit with an electrical conductor; and analyzing the received sample and separation solution with a mass analysis system.

12. The method of claim 11, the method further comprising supplying the transport liquid to the transport liquid supply conduit from a transport liquid supply system in fluidic communication with the transport liquid supply conduit.

13. The method of claim 11, wherein the receiving volume is defined at least in part by a meniscus.

14. The method of claim 11, the method further comprising receiving the second end of the capillary within the meniscus.

15. The method of claim 11, wherein a perimeter of the second end of the capillary is in contact with the removal conduit.

16. The method of claim 11, the method further comprising receiving an interface defining the receiving volume proximate the removal conduit.

17. The method of claim 11, wherein the sampling device performs at least one of capillary electrophoresis and liquid chromatography to obtain the sample.

18. The method of claim 11, the method further comprising receiving the sample and the separation solution from the capillary, wherein the sample and the separation solution are released from the second end of the capillary under gravity into the receiving volume.

19. The method of claim 11, wherein the separation solution is diluted by the transport liquid to allow for ionization by the mass analysis system.

* * * * *